(12) United States Patent
Feith

(10) Patent No.: US 7,506,899 B2
(45) Date of Patent: Mar. 24, 2009

(54) MULTI-DIAMETER TUBE FITTING

(75) Inventor: Raymond P. Feith, Chino Hills, CA (US)

(73) Assignee: Rain Bird Corporation, Azusa, CA (US)

( * ) Notice: Subject to any disclaimer, the term of this patent is extended or adjusted under 35 U.S.C. 154(b) by 322 days.

(21) Appl. No.: 11/157,658

(22) Filed: Jun. 21, 2005

(65) Prior Publication Data

US 2005/0285395 A1    Dec. 29, 2005

Related U.S. Application Data

(63) Continuation-in-part of application No. 10/394,343, filed on Mar. 20, 2003, now Pat. No. 6,988,747.

(51) Int. Cl.
*F16L 21/06* (2006.01)

(52) U.S. Cl. .................................. 285/322; 285/243

(58) Field of Classification Search ............... 285/239, 285/243, 322
See application file for complete search history.

(56) References Cited

U.S. PATENT DOCUMENTS

| | | | |
|---|---|---|---|
| 2,805,088 A * | 9/1957 | Swick, Jr. et al. ........... 285/239 |
| 3,272,536 A * | 9/1966 | Weinhold ................... 285/114 |
| 3,633,944 A | 1/1972 | Hamburg |
| 4,257,629 A | 3/1981 | Maple et al. |
| 4,508,369 A | 4/1985 | Mode |
| 4,593,943 A | 6/1986 | Hama et al. |
| 4,657,286 A | 4/1987 | Guest |
| 4,660,803 A | 4/1987 | Johnston et al. |
| 4,722,560 A | 2/1988 | Guest |
| 4,919,457 A | 4/1990 | Moretti |
| 4,946,213 A | 8/1990 | Guest |
| 5,230,539 A * | 7/1993 | Olson ........................ 285/323 |
| 5,683,120 A * | 11/1997 | Brock et al. ........... 285/148.21 |
| 5,775,742 A * | 7/1998 | Guest ......................... 285/323 |
| 5,779,284 A | 7/1998 | Guest |
| 5,921,586 A | 7/1999 | Prassas et al. |
| 5,954,372 A | 9/1999 | Moynihan |
| 6,027,125 A | 2/2000 | Guest |
| 6,158,783 A * | 12/2000 | Johnson ..................... 285/205 |
| 6,170,887 B1 * | 1/2001 | Salomon-Bahls et al. ... 285/322 |
| 6,183,022 B1 * | 2/2001 | Guest ......................... 285/322 |
| 6,231,090 B1 | 5/2001 | Fukao et al. |
| 6,302,451 B1 | 10/2001 | Olson |
| 6,439,620 B1 * | 8/2002 | Guest ......................... 285/347 |

(Continued)

FOREIGN PATENT DOCUMENTS

GB    2 211 506 A    7/1989

(Continued)

*Primary Examiner*—David E Bochna
(74) *Attorney, Agent, or Firm*—Fitch, Even, Tabin & Flannery

(57) ABSTRACT

A method and apparatus for coupling ends of tubes, particularly tubes of different outer diametral sizes. The coupling includes resiliently deformable portions for retaining and sealing the tube within the coupling in a generally leak-proof manner, and an insert is provided for reception within the end of each tube. The insert imparts a greater level of stiffness to the tube for improving the sealing of the tube within the coupling. The insert provides a tight friction-fit between the insert and tube and retards or restricts withdrawal of the insert and tube from the coupling.

15 Claims, 2 Drawing Sheets

U.S. PATENT DOCUMENTS

| | | |
|---|---|---|
| 6,464,266 B1 | 10/2002 | O'Neill et al. |
| 6,517,124 B1 | 2/2003 | Le Quere |
| 6,722,702 B1 | 4/2004 | Min-Cheol |
| 6,769,721 B2 * | 8/2004 | Guest .......................... 285/347 |
| 6,877,777 B1 * | 4/2005 | Wartluft ...................... 285/255 |
| 6,880,865 B2 * | 4/2005 | Guest .......................... 285/322 |
| 6,988,747 B2 * | 1/2006 | Allen et al. .................. 285/322 |
| 7,093,862 B2 * | 8/2006 | Muto ........................... 285/322 |
| 2004/0240940 A1 | 12/2004 | Erickson et al. |

FOREIGN PATENT DOCUMENTS

| | | |
|---|---|---|
| JP | 1206196 | 8/1989 |

\* cited by examiner

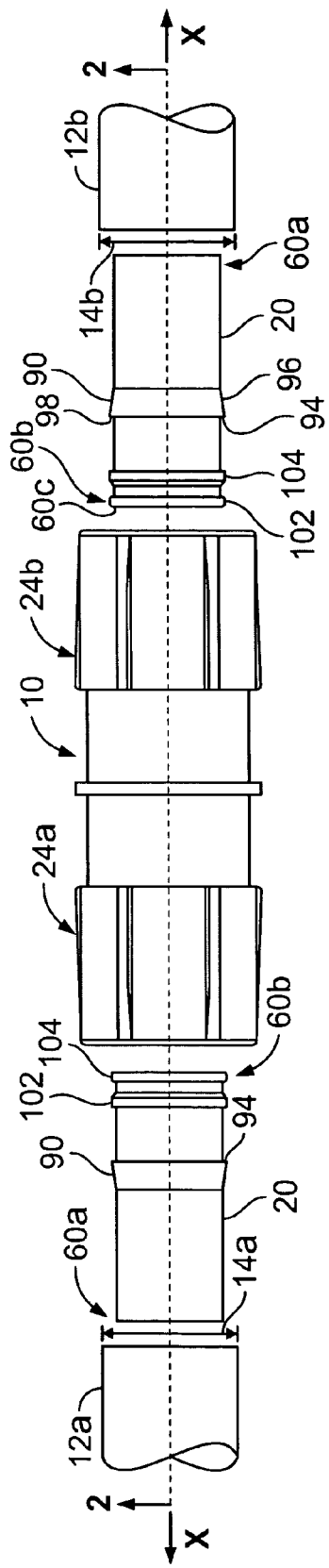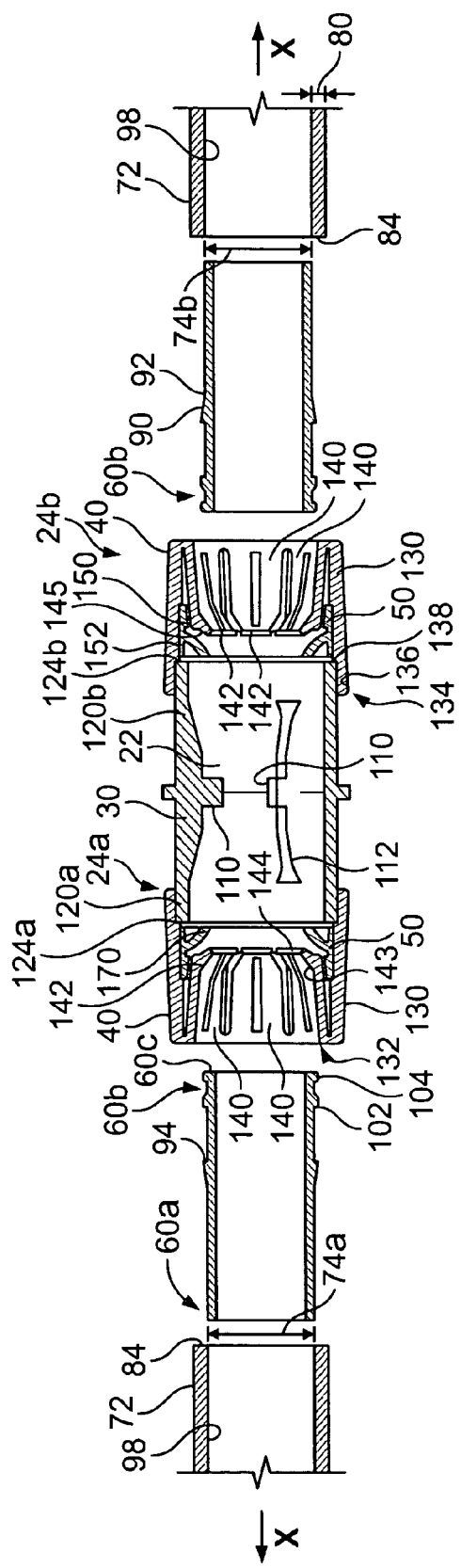

MULTI-DIAMETER TUBE FITTING

CROSS-REFERENCE TO RELATED APPLICATION

This application is a continuation-in-part of U.S. patent application Ser. No. 10/394,343, filed Mar. 20, 2003, which has now issued as U.S. Pat. No. 6,988,747 on Jan. 24, 2006, entitled "Multi-Diameter Tube Coupling," the specification of which is incorporated by reference in its entirety.

FIELD OF THE INVENTION

The invention relates to coupling of tubes and, in particular, to an insert attached to a tube and a coupling device for receiving the insert and tube therein.

BACKGROUND OF THE INVENTION

Tubes or pipes are utilized in many environments for providing a conduit which may be used to deliver fluid flow or carry cables or wires, for instance. As an example, an irrigation network or system typically has a water source such as a water main or a well source with a pump for delivering water. Connected to the water source is one or more pipes for delivering water through the network, which may consist of a series of fluid-delivering arteries. Throughout the network, there is a number of pipes or tubes delivering water to sprinklers or other types of irrigation devices. Each of these tubes is coupled to each other, preferably with a generally leak-free connection.

Some of these connections are made by connecting threaded ends of the pipes to each other or to threaded couplings. Threaded joints present a number of deficiencies in use, such as being labor-intensive to connect. Threaded couplings also require full mating or seating of one member within another. This seating requires a certain degree of precision in sizing of pipes so that they span the proper distance. Nonetheless, threaded joints are prone to leaking, particularly as a result of deflection of one tube relative to the other which applies stress at the threads between the tubes. In order to improve the seal through threaded joints, the joints may be treated with pipe cement, or otherwise permanently joined, such as by welding. These methods tend to be messy, or labor-intensive, or both. Additionally, these methods are unreliable, and replacing a pipe or leaking coupling that has been welded or glued requires cutting out the joint and replacing the removed section, which itself may require re-threading fresh ends of the pipes and/or adding an additional pipe and coupling.

Frequently, the various tubes throughout the system lack a uniform diameter. That is, one tube may have a diameter of one size, while the tube to which it is to be joined has a diameter of a different size. This occurs for a number of reasons, such as consumers not recognizing the diametral difference when purchasing tubing, various manufacturers being partial to different tube gauges, or intentional variance to account for various flow rates through the fluid delivery system. Many couplings for joining pipes of different diameters merely make a step so that the coupling accommodates two specific tube sizes, thereby requiring a different coupling for each combination of possible tube sizes.

One concept for joining pipes or tubes that alleviates some of these issues is by using a joint coupling that includes at least two openings, each opening corresponding to a tube to be joined, wherein each opening includes a radial array of flexible or resiliently deformable members, such as a ring of fingers, for either sealing with or retaining a tube end within the coupling. One example of this concept is described in U.S. Pat. No. 6,231,909, to Fukao et al.

One problem with the fingered ring is the stiffness required. If the fingers are relatively soft, a tube may be easily inserted therein, and its position may easily be adjusted. However, a pressure surge through the tube and coupling may cause the tube to be expelled from the coupling. Alternatively, if the fingers are relatively stiff, such as if a metal ring is used with a radial array of barbed fingers, a pressure surge typically causes the fingers to bite into the tube. Unfortunately, these stiff fingers require greater work for receiving the tube and make adjusting the tube therein more difficult. Additionally, a coupling with stiffer materials does not tend to seal as well as a coupling where the fingered ring deforms more easily to compress against a seal.

Accordingly, there has been a need for an improved coupling device for connecting tubes, including tubes of different diametral sizes.

BRIEF DESCRIPTION OF THE DRAWINGS

FIG. 1 is an exploded side elevation view of a coupling, tubes to be connected by the coupling, and inserts for promoting the connection between the coupling and the tubes;

FIG. 2 is a cross-sectional view of the coupling, tubes, and inserts taken through the line 2-2 of FIG. 1;

DESCRIPTION OF THE PREFERRED EMBODIMENTS

Figure 3:
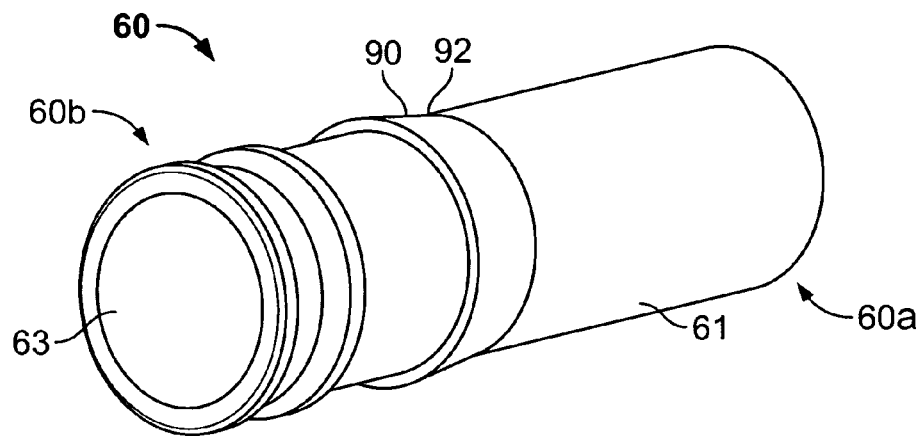
FIG. 3 is a perspective view of the insert.

Referring initially to FIGS. 1 and 2, a coupling device 10 is depicted for receiving and interconnecting tubes 12, and an insert 60 is provided for connecting the tubes 12 to the coupling 10. The tubes 12 may include a first tube 12a having a first outer diameter 14a, and a second tube 12b having a second outer diameter 14b. In use, the coupling 10, the tubes 12a, 12b, and the inserts 60a, 60b are joined to provide a generally leak-free connection defining a flow path therethrough. In a preferred embodiment, the tubes 12 are formed from polyethylene, more preferably with low-density polyethylene, or vinyl. Additionally, the preferred material for the insert is acrylonitrile butadiene styrene (ABS) or Delrin.

The preferred coupling 10 is generally cylindrical, defines a cavity 22 (FIG. 2), and is straight such that it has a central axis X generally parallel to the direction of fluid flow therethrough. More specifically, the coupling 10 has a first coupling portion 24a and a second coupling portion 24b for receiving and connecting, socket-like, with the tubes 12a, 12b respectively. Either of the coupling portions 24a, 24b may be an inlet or outlet portion, and the central axis of each coupling portion 24a, 24b is aligned with the central axis X. In other embodiments, the coupling 10 may be angled, such as in an elbow pipe, such that the first coupling portion 24a is set at an angle with respect to the second coupling portion 24b, and each coupling portion 24 has its own central axis parallel to fluid flow therethrough. In other configurations, the coupling 10 may provide for connection of more than two tubes, such as to form a T-shaped coupling having three coupling portions. Each coupling portion 24a, 24b attaches to a central body portion 30 and includes an annular retainer collet 40 for receiving and retaining a respective tube 12a, 24b, and an annular seal 50 for receiving a portion of the collet 40 and tube 12a, 12b and for sealing around the tube 12.

To promote and enhance retention and sealing, each tube 12a, 12b is fitted with the insert 60. The insert 60 restricts the ability of a pressure surge to eject the tube 12 from the coupling 10 while also allowing an installer to adjust easily the amount of tube 12 located within the coupling 10.

As noted above, the first and second tubes 12a and 12b are depicted having first and second respective outer diameters 14a and 14b (FIG. 1). The outer diameters 14a, 14b may be substantially identical or may be significantly different in size. Additionally, the tubes 12a, 12b have respective inner diameters 74a and 74b, which may be substantially identical or may be significantly different in size (FIG. 2). Each coupling portion 24a, 24b is designed to accommodate tubes of varying sizes such that particular couplings 10 are not required for particular size tubes or combination of tube sizes.

Each tube 12a, 12b includes a respective end 72 for insertion into the coupling 10. The end 72 is defined by its respective outer diameter 14a, 14b and inner diameter 74a, 74b, and the difference between the outer and inner diameters 14a, 14b and 74a, 74b determines a wall thickness 80. As discussed, the coupling 10 accommodates tubes having a range of external diameters. Each end 72 terminates with an end surface 84.

The insert 60 is slide or force-fitted into each end 72. The preferred insert 60 has a generally cylindrical body 61 having an inner surface 63 with a generally uniform inner diameter 64 for allowing fluid flow therethrough. It is preferred that the insert 60 is relatively secure within the tube 12 so that a pressure surge does not allow the tube 12 to separate from the insert 60. It is also preferred that the insert 60 is easily push-fit within the tube end 72 by an installer.

Figure 4:
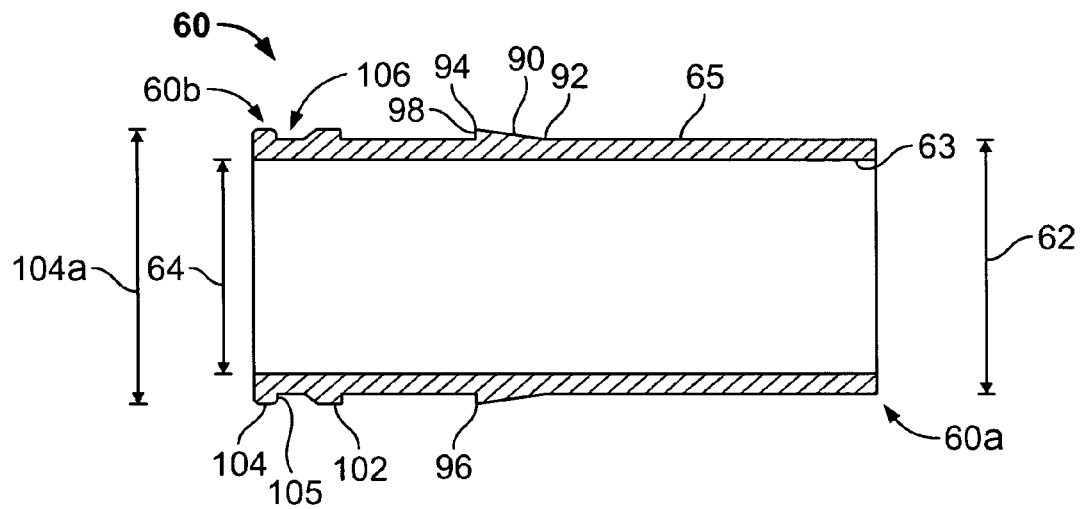
FIG. 4 is a cross-sectional view of the insert.

Typically made of polymeric or plastic material, the tubes 12 have at least some amount of elasticity. Accordingly, the insert 60 may utilize this elasticity to assist in forming a tight friction fit between the insert 60 and the tube 12. As can be seen in FIG. 4, the insert body 60 has an outer surface 65 with a generally uniform outer diameter 62 interrupted by several surface features, which will be described below. To assist with the friction fit between the insert 60 and the tube 12, the outer diameter 62 may be slightly greater than the inner diameter 14 of the tube 12. The elastic deformation provides a tight fit between the insert 60 and the tube 12. Additionally, the elastic deformation allows an insert 60 with a particular outer diameter 62 to be used with tubes 12 having a narrow range of inner diameters 14. Furthermore, a series of inserts 60 may be provided corresponding to individual inner diameter tubes or to ranges of inner diameter tubes. For instance, an insert may have an outer diameter 62 of 16.2 millimeters for use either with a tube of 16 millimeters, or for use with tubes ranging in size from 14.5 to 16 millimeters.

Figure 5:
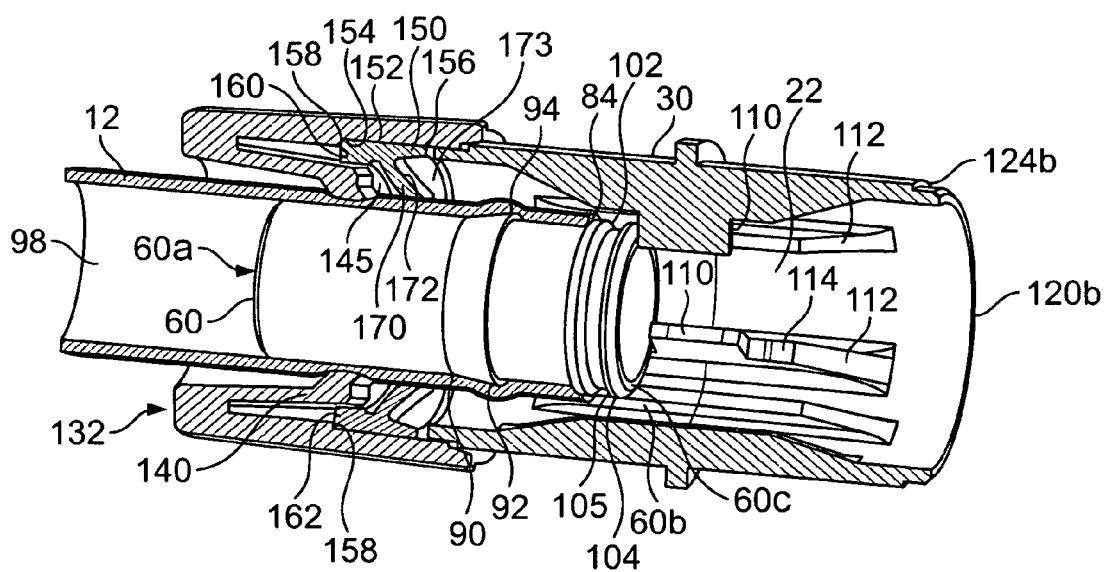
FIG. 5 is a partial cross-sectional perspective view of the coupling showing a tube received therein, and showing the insert received in the tube and the coupling.

The tight fit between the tube 12 and the insert 60 also may be provided and/or enhanced by surface features on the insert 60. For instance, the surface 65 of the insert 60 may include an annular ramp 90 leading during fitting within the tube 12 and an annular barb 94 formed by a trailing edge 96 and an annular shoulder 98. The ramp 90 is positioned approximately midway along the exterior of the insert 60. The insert 60 has a leading terminal end 60a which is inserted first into the tube 12. The insert 60 is forced into the tube 12 such that the terminal end 84 of the tube 12 passes over and beyond the ramp 90, as can be seen in FIG. 5.

The resilient elasticity of the preferred tube 12 allows it to expand in a localized region as the region passes over the ramp 90, and the elasticity causes the localized region of the tube 12 to contract inwardly once it has passed the barb 94. Once the tube 12 is mounted on the insert 60 to a desirable depth, an inner surface 98 of the tube 12 presses against and generally conforms to the barb 94 in a localized region, and the force required to pull and separate the tube 12 from the insert 60 is significantly increased. The barb 94 may be sized so that the insert 60 forms a tight friction fit with tubes having a range of inner diameters and elasticity, or for a particular tube size and material.

The insert 60 also includes two annular rings at a coupling insertion end 60b and to one side of the ramp 90. The insertion end 60b is a leading end when the insert 60 and tube 12 are received in the coupling 10, as will be discussed below. The first of the annular rings is an annular stop ring 102 for the tube 12 to catch the tube end 84 to prevent further insertion of the insert 60 into the tube 12. That is, the insert 60 is forced into the tube 12 until the end surface 84 abuts the stop ring 102.

The second of the annular rings is an annular end ring 104 positioned at a terminal end 60c of the insert coupling insertion end 60b. When the tube 12 and the insert 60 are received at a maximum insertion depth within the coupling 10, the end ring 104 abuts the stop tabs 110 within the coupling body 30. More specifically, the coupling body 30 includes a plurality of stop tabs 110, which project inwardly and are sized to minimize impedance of water flow through the body 30. It should be noted that, alternatively, an annular ring (not shown) may be formed on the interior of the body 30 to form a circular stop shoulder against which the ring 104 may abut when fully inserted into the coupling 10.

Leading up to each of the stop tabs 110 is a ramp 112 and a plateau 114 joining the stop tab 110 with the ramp 112. In this manner, the insert 60 is guided along the ramps 112 and against the stop tabs 110 so that the central axis of the insert 60, when located within the coupling 10, is aligned with the central axis X of the coupling portion 24 within which it is located. The plateaus 114 allow the insert 60 be positioned either against the stop tab 110 at a maximum insertion, or within a short distance thereof so that an installer can adjust the depth of insertion. By allowing adjustment of the depth, the coupling 10 requires less precision in selecting tube length for spanning various distances.

In the preferred embodiment, the body 30 includes three projecting stop tabs 110 at equally spaced angular intervals of 120 degrees, and a radially inwardly tapering ramp 112 for each stop tab 110. The stop tabs 110 and ramps 112 are provided for each coupling portion 24 for cooperating with an insert 60 positioned therewithin. The insert end ring 104 may be provided with an outer diameter 104a sized to loosely engage each of the plateaus 114.

As noted above, the coupling 10 includes the annular collet 40 and the annular seal 50, which cooperate with the tube 12 and insert 60 to retain the tube 12 therein with a generally leak-proof connection. Each coupling portion 24a and 24b includes a corresponding end 120a and 120b, respectively, of the body 30. The ends 120a, 120b each form a shoulder 124a, 124b at their terminal edge against which one of the collets 40 seats. Each collet 40 includes an outer annular ring 130 having a receiving end 132 into which the tube 12 and insert 60 are received and a securing end 134 for attaching to the body 30. The securing end 134 includes an annular skirt portion 136 that extends over the body end 120 and forms a shoulder 138 that abuts the body shoulder 124. Preferably, each collet 40 is fixedly attached to the body 30, such as by snap-fit cooperating structure, glue, or electronic welding. Alternatively, the collet 40 may be formed integrally with the body 30.

The collet receiving end 132 includes an annular array of fingers 140 extending within the collet 40 with an inward angle. The fingers 140 are resiliently deflectable so that, when the tube 12 and insert 60 are inserted therein, the fingers 140 deflect outwardly to permit the entrance of the tube 12 and insert 60, while also biasing inward with sufficient force to compress against the tube 12 and the insert 60 to inhibit relative motion therebetween and to retain the tube 12 within the coupling 10.

As best viewed in FIG. 2, each finger 140 has a terminal end portion 142 forming a barb 144 with a slight inward angle. The end portion 142 has a surface 143 at an inward angle greater than the general angle of the end portion 142. As such, the end portion 142 is dimensioned to permit the tube 12 and insert 60 to be forced within the fingers 140, while the array of corresponding end portions 142 provide less clearance for the tube 12 and insert 60. Therefore, the largest compressive force on the tube 12 and insert 60 is experienced at the barb 144. Each barb 144 forms a shoulder 145 generally transversely oriented relative to the central axis X.

As can be seen in FIG. 5, the barb 144 deforms the tube 12 inwardly in a localized region. When the insert 60 and tube 12 are forced into the coupling 10, the fingers 140 spread outward to allow the rings 102 and 104 to pass therethrough, as well as the ramp 90. In contrast to a tube 12 without an insert forced into the coupling 10, the insert 60 increases the stiffness of the tube 12 portion in which the insert 60 is located, thereby increasing the pressure of the barb 144 against the tube 12. That is, a tube 12 alone is relatively compressible or deformable by the barb 144, allowing the tube 12 to slip somewhat against the barb 144. The insert 60 limits the ability of the tube 12 to collapse in order to slip across the barb 144.

Once the ramp 90 has passed by, a certain amount of force is required to adjust the depth of insertion of the tube 12. More precisely, a first force is required to increase insertion of the tube 12 due to the friction between the barb 144 and the tube 12. During insertion, the tube 12 contacts and slides against the surface 143 to cause the barb 144 to deflect outward. A second force is required to withdraw a portion of the tube 12, the second force being greater than the first force as the shoulder 145 of the barb 144 will tend to bit into the tube 12. Additionally, retraction of the tube 12 sufficient to align the ramp 90 within the barbs 144 causes the angle of the tube 12 covering the ramp 90 to be at a sharper angle relative to the barb shoulder 145, thereby significantly increasing the force required to continue withdrawal of the tube 12.

Should the tube 12 be withdrawn to a degree that the ramp 90 has passed by the barbs 144, the rings 102, 104 provide additional retention against separation. That is, the ramps 90 in the depicted orientation allow for a linear increase in force required to force the barbs 144 inward as the barb 144 follows the ramp 90. However, when the barbs 144 reach rings 102, 104, a third force, greater than both the first and second, is required to separate the insert 60 from the coupling 10.

More specifically, the third force is required to pull both rings 102, 104 past the barb 144 as the barb shoulder 145 comes in contact with a portion of the tube 12 abutting the ring 102. Although the tube 12 itself lessens the sharpness of the interface between the barb shoulder 145 and the first ring 102, such is not the case for the second ring 104.

The rings 102 and 104 are separated by a gap 106 (FIG. 4). When the tube 12 is withdrawn to an extent sufficient for the barb 144 to pass by the first ring 102, the barb 144 will bias itself into the gap 106. Further extraction brings the barb shoulder 145 into a confronting relationship with a radially oriented (i.e., generally flat) shoulder 105 formed on the ring 104. Accordingly, a significantly greater force is required to force the barb 144 over the ring 104 to separate the insert 60 from the coupling 10. The preferred amount of force for the third force is that which would not be exceeded in normal use for the specific system in which the coupling is being employed. Indeed, it is preferred that is accomplished by the second force, and the threshold of the third is a last resort.

In this manner, the surface features of the insert 60 resist separation of the tube 12 from the coupling. The ramp barb 94 cooperates with the deformable tube 12 to resist separation or relative motion therebetween. The ramp 90 and rings 102 and 104 serve to resist the insert 60 and tube 12 from passing by the collet barbs 144.

The inward elastic bias of the fingers 140 is promoted by the seal 50. As can be seen in FIGS. 2 and 5, the seal 50 has an annular ring 150 with an outer surface 152 generally abutting an interior surface 154 of the collet ring 130. The seal ring 150 has a first end 156 abutting the coupling body shoulders 124, and has a second end 158 abutting a shoulder 160 formed on the collet ring interior surface 154. As such, the body 30 and collet 40 define the position of the seal 50.

To promote the bias of the fingers 140, the seal ring 150 has a base portion 162 proximate the second end 158 located between the collet ring 130 and the fingers 140. In this manner, deflection of the fingers 140 radially outwardly compresses the fingers 140 into the resilient material of the seal ring 150. The seal ring 150 reacts by biasing the fingers 140 radially inwardly, thereby increasing the compressive force of the barbs 144 against a tube 12 located therein.

The seal 50 and tube 12 cooperate to seal, in a generally leak-proof manner, the tube 12 with the coupling 10. To this end, the seal 50 includes a seal lip 170 preferably formed integral with the seal ring 150 of a resiliently deformable material. When a tube 12 is inserted, the seal lip 170 contacts the tube 12 and may deform outwardly to permit reception of the tube 12 therethrough.

The seal lip 170 has a shaped that is somewhat frusto-conical or arcuately sloped and annular, and the seal lip 170 extends radially inwardly from the seal ring 150 and angled away from the collet receiving end 132. The seal lip 170 has a pressure-receiving surface 172 which, along with the seal ring 150, defines an open cavity or annular recess 173 (see FIGS. 2 and 5) exposed to the interior of the coupling 10. As fluid flows through the coupling 10, flow pressure will generally be experienced within the coupling including on the pressure-receiving surface 172 of the seal lip 170. This internal pressure will tend to push the seal lip 170 toward the central axis X and toward the receiving end 132 of the collet 40. Accordingly, the pressure therein will force the seal lip 170 against the tube 12 to enhance the sealing therewith.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. A coupling system for fluid carrying tubes having a first end portion for insertion into the coupling system and having an inner surface and an outer surface, the coupling system comprising:

an insert for reception within the first end portion of the tube, the insert comprising a cylindrical body having an inner surface and an outer surface, the inner surface defining a fluid passage through the insert, and the outer surface being configured such that it is capable of engaging the inner surface of the tube wherein a predetermined threshold of force beyond that of normal use conditions of the coupling system is required to separate the insert from the tube;

a coupling defining a socket for receiving the insert and first end portion of the tube, the socket having gripping fingers and a seal, the gripping fingers engaging the outer surface of the tube to restrain removal of the tube and insert from the coupling, and the seal engaging the outer surface of the tube to provide an at least substantially sealed interconnection therebetween; and a resistance portion of the outer surface of the insert being configured to engage the gripping fingers to restrict separation of the insert from the coupling.

2. The coupling system of claim 1 wherein the insert outer surface is capable of forming a friction engagement with the inner surface of the tube to restrain removal of the insert from the tube.

3. The coupling system of claim 2 wherein the body is sufficiently rigid so as to be capable of expanding the tube during insertion of the insert into the tube.

4. The coupling system of claim 2 wherein the outer surface of the insert has a generally constant outer diameter and includes at least one projection extending beyond the outer diameter to engage the inner surface of the tube to restrain removal of the insert from the tube.

5. The coupling system the claim 4 wherein the at least one projection is sized to compress at least a portion of the tube between the at least one projection and the coupling to restrain removal of the tube from the insert and to restrain removal of the insert and tube from the coupling.

6. The coupling system of claim 5 wherein the at least one projection includes an edge that is capable of gripping the inner surface of the tube to restrain removal of the insert from the tube.

7. The coupling system of claim 6 wherein the at least one projection includes a surface that expands the tube to facilitate insertion of the insert into the tube.

8. The coupling system of claim 7 wherein the at least one projection is an annular projection about the body.

9. The coupling system of claim 4 wherein the body includes a leading end and trailing end and the at least one projection is located between the leading end and the trailing end.

10. The coupling system of claim 1 wherein the resistance portion of the insert outer surface includes a first projection near the leading end of the body and a second projection spaced from the first projection forming a groove therebetween for receiving the gripping fingers for further restraining removal of the insert from the coupling.

11. The coupling system of claim 10 wherein one of the projections is capable of limiting insertion of the insert into the tube.

12. The coupling system of claim 11 wherein the projections are annular projections.

13. The coupling system of claim 1 wherein the coupling defines a second socket for receiving a second insert and a first end portion of a second tube, the second socket having gripping fingers and a seal, the gripping fingers engaging an outer surface of the second tube to restrain removal of the second tube and second insert from the coupling, and the second seal engaging the outer surface of the second tube to provide an at least substantially sealed interconnection therebetween.

14. The coupling system of claim 1 wherein the coupling system is adapted to received tubes of different outer diameters.

15. The coupling system of claim 1 wherein the resistance portion is configured so that a force necessary to separate the insert from the coupling is greater than the force to separate the tube from the insert.

* * * * *